United States Patent
Boss et al.

(10) Patent No.: US 6,772,735 B2
(45) Date of Patent: Aug. 10, 2004

(54) METHOD FOR CONTROLLING AN INJECTION VALVE

(75) Inventors: Juergen Boss, Kornwestheim (DE); Klaus Zimmermann, Vienna (AT); Andreas Hoyler, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 10/088,581

(22) PCT Filed: Jun. 15, 2001

(86) PCT No.: PCT/DE01/02233
§ 371 (c)(1),
(2), (4) Date: Jul. 24, 2002

(87) PCT Pub. No.: WO02/08599
PCT Pub. Date: Jan. 31, 2002

(65) Prior Publication Data
US 2003/0029414 A1 Feb. 13, 2003

(30) Foreign Application Priority Data
Jul. 22, 2000 (DE) .......................... 100 35 815

(51) Int. Cl.⁷ ............................................. F02M 41/00
(52) U.S. Cl. .................. 123/467; 123/504; 123/446
(58) Field of Search .................. 123/503, 504, 123/501, 500, 498, 467, 447; 239/102.2, 88, 533.2

(56) References Cited

U.S. PATENT DOCUMENTS

| | | | |
|---|---|---|---|
| 4,705,003 A | 11/1987 | Sakakibara et al. | |
| 4,784,102 A | 11/1988 | Igashira et al. | |
| 5,152,271 A | 10/1992 | Matsumura | |
| 5,407,131 A | 4/1995 | Maley et al. | |
| 5,607,106 A * | 3/1997 | Bentz et al. | 239/88 |
| 5,713,326 A * | 2/1998 | Huber | 123/299 |
| 6,240,905 B1 * | 6/2001 | Boecking | 123/498 |
| 6,253,736 B1 * | 7/2001 | Crofts et al. | 123/498 |

FOREIGN PATENT DOCUMENTS

DE    199 30 309    1/2001

* cited by examiner

Primary Examiner—Mahmoud Gimie
(74) Attorney, Agent, or Firm—Kenyon & Kenyon

(57) ABSTRACT

A method for controlling an injector is described, where the trigger signal for the actuator is controlled as function of the amplitude and the duration. The actuator, using an hydraulic coupler, actuates a control valve which, at a low voltage, operates in a ballistic mode and opens up an opening cross-section to an inlet channel. The opening cross-section becomes smaller with increasing trigger voltage, and the fuel quantity to one injected increases. The control valve is brought from ballistic mode to nonballistic mode via the amplitude and duration of the trigger voltage. The delivery duration and the amplitude of the trigger voltage are tuned to each other so that one or several jumps may occur, during which a switch is made from one voltage value to another voltage value, and from one delivery duration to another delivery injection. A piezoelectric element is preferably used as an actuator.

12 Claims, 4 Drawing Sheets

METHOD FOR CONTROLLING AN INJECTION VALVE

FIELD OF THE INVENTION

The present invention relates to a method for controlling an injector via which a specified quantity of fuel is injected into the cylinder of an internal combustion engine.

BACKGROUND OF THE INVENTION

Methods of fuel injection into an internal combustion engine, in particular in direct injection, are already known. For example, in a unit injector system (UIS), a control valve is controlled by a magnetically operated actuator in step with a trigger signal for injecting, under high pressure, a specified quantity of fuel into the combustion chamber of the engine. This creates the problem of also being able to inject the smallest possible controllable quantities of fuel. These small quantities are on the order of magnitude of up to 2 $mm^3$ for all operating conditions. In the case of the known magnetically controlled actuators, these small quantities cannot be achieved, especially when the engine runs at high rotational speeds, since the control valve is only adjustable to a limited extent in intermediary positions between the open and closed states. Piezoelectric actuators, on the other hand, control the injected quantity only via a constant opening cross-section, formed between the control valve and its seat in the intake channel.

SUMMARY OF THE INVENTION

The method according to the present invention for controlling an injector has the advantage over the related art that, for controlling the fuel quantity, the trigger signal for the actuator is adjustable in amplitude as well as in duration. This has the advantage that it is possible to inject a small, precisely-metered fuel quantity not only at low RPMs and low load. It is also possible—in particular when using a piezoelectric actuator—to inject the quantity of fuel to be injected in a targeted manner and, as a function of engine load and rotational speed, in a defined manner, via the amplitude of the trigger voltage as well as the duration of the applied control signal. It is particularly advantageous that it is possible to also consider parameters containing engine-related, emission-relevant, and drive-specific components.

It is considered especially favorable that the trigger signal is initially selected in such a way that the control valve is in ballistic mode and therefore clears the opening cross-section of the intake channel. If the injection quantity is to be increased, the amplitude of the trigger signal is simply increased as well, with initially the same delivery duration, so that the opening cross-section of the inlet channel narrows. During this phase, the duration of the trigger signal remains constant.

To further increase the injection quantity, the control valve is advantageously switched to nonballistic mode. This makes is possible to achieve further increases in the quantity of fuel to be injected, even after the switchover to nonballistic mode.

It is also considered advantageous to increase the duration of the delivery until the quantity of fuel to be injected is larger than that which can be achieved with a closed control valve and short trigger signal. In this case, in order to achieve a favorable engine behavior, it is possible to provide at least one jump in the delivery duration and amplitude of the control signal in order to achieve a change in the determination of the quantity.

This makes it possible to select the maximum amplitude of the control signal with only one jump. Further increase in the injection quantity is then achieved by extending the duration of the delivery.

In an alternative embodiment, several jumps may be used, increasing the trigger voltage incrementally and adapting the delivery duration to the specified injection quantity with each jump.

It is also possible to advantageously increase the trigger signal up to its maximum value, with the control valve resting on the valve seat and sealing off the opening cross-section. In this case, further increase in the trigger signal does not result in an additional increase in the delivery quantity. Rather, the latter is achieved by extending the duration of the delivery.

An advantageous application of the method uses a piezoelectric actuator, which is used in particular in a direct-injection system.

DETAILED DESCRIPTION

Figure 1:
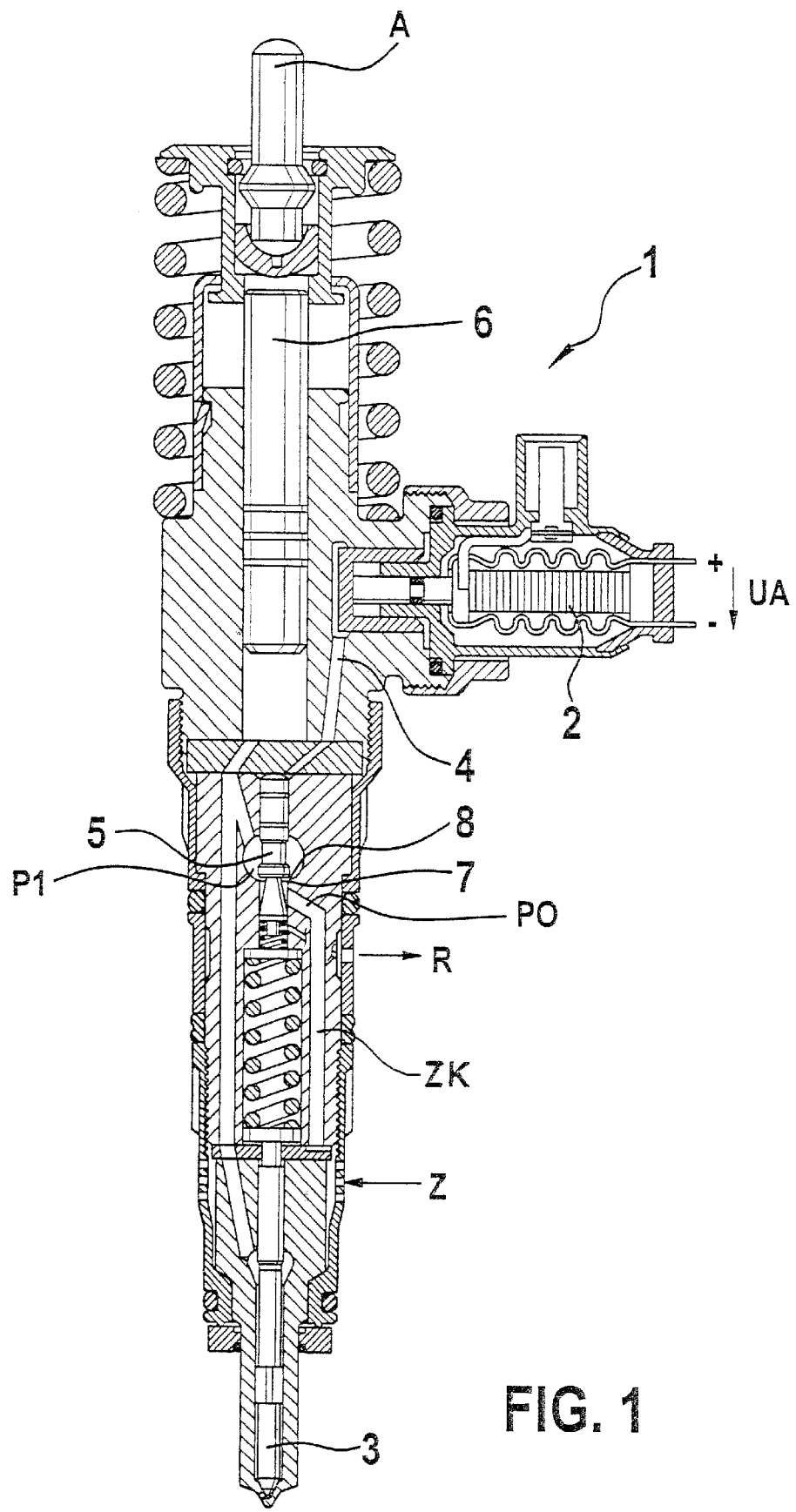
FIG. 1 shows an injection valve having a unit injector.

FIG. 1 is a sectional view of injector 1 having a unit injector system (UIS). In this known unit, pump unit 6 is actuated by a plunger A and generates a high injection pressure P1 in a high-pressure channel. The fuel to be injected is in the high-pressure channel and capable of being injected—at a corresponding pressure—into the cylinder of an internal combustion engine (not shown) via a nozzle needle 3. The way this injector valve functions is known per se and, therefore, only its basic functions are explained. The central element is a control valve 5, located in the high-pressure area and, depending on its position in relation to valve seat 7, forms an opening cross-section 8, via which more or less fuel is able to flow into an inlet channel ZK that is formed between a connector Z and opening cross-section 8. In this inlet channel ZK, there is a corresponding low pressure (inlet pressure P0). Control valve 5 is actuated—via an hydraulic coupler 4—by an actuator 2 that receives a trigger voltage Ua via terminals + and -. Actuator 2 essentially has a piezoelectric element that performs linear expansion as a function of trigger voltage Ua. Depending on the change in length of actuator 2, control valve 5 is moved via hydraulic coupler 4 and achieves any desired intermediate position in the so-called ballistic mode. If, on the other hand, control valve 5 rests on valve seat 7, the so-called nonballistic mode is achieved where the opening cross-section =0.

The present invention is now based on the idea of configuring control valve 5 by varying the amplitude and trigger duration of trigger signal Ua in such a way that in every operating state of the internal combustion engine the desired fuel quantity to be injected is achieved by the position of control valve 5 and its dwell time in one position. It is assumed here that at a maximum value of trigger signal Ua, i.e. the maximum trigger voltage $U_{max}$, control valve 5 rests firmly on valve seat 7, causing the opening cross-section to be 0. Therefore, a fuel quantity is injected as a function of delivery duration FD, which may be expressed in degrees per crank angle of the crankshaft or camshaft. Alternatively, it is possible to specify an injection duration on a time scale. In ballistic mode, on the other hand, the injection quantity is reduced—always measured at constant injection duration—because, depending on the position of control valve 5 over opening cross-section 8, more or less fuel may flow into inlet channel ZK in the direction Z. By optimally controlling the position of control valve 5 and also delivery duration FD, which depends on the length of trigger signal Ua, it is possible to control the quantity of fuel to be injected. It is advantageous here that all operating conditions or requirements for the exhaust gas or driving behavior are capable of being taken into consideration.

Figure 2:
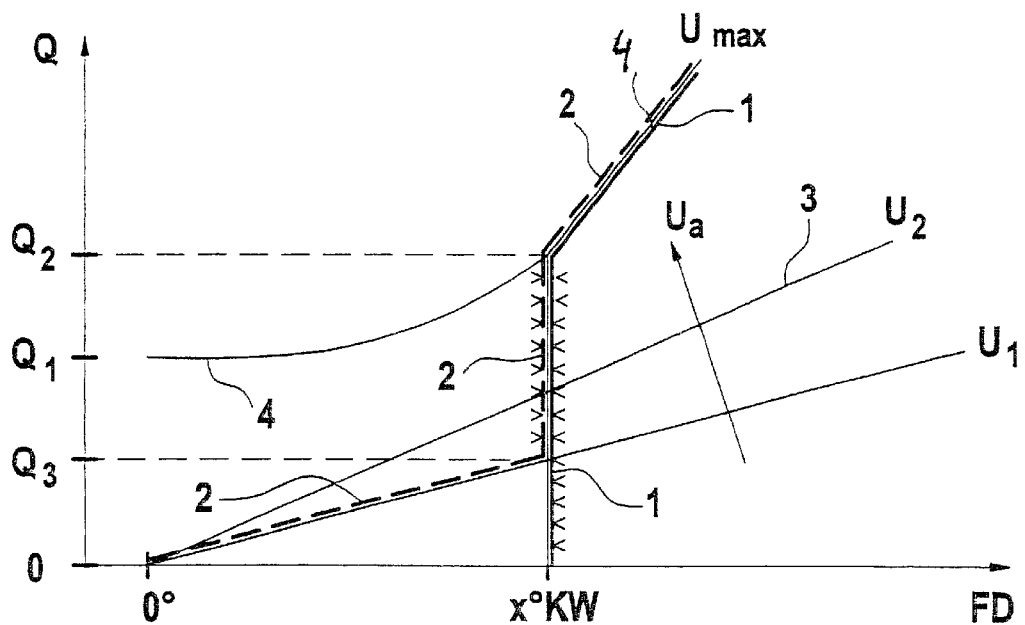
FIG. 2 shows a first diagram having characteristic curves for injection quantities as a function of the delivery duration and voltage.

FIG. 2 shows a first diagram containing delivery/injection-quantity characteristics, based on which it is possible to build an initial embodiment for trigger sequences. Delivery duration FD is plotted on the x axis, and injected fuel quantity Q is plotted on the y axis. The delivery duration is preferably stated in angular degrees of crankshaft KW. The effect on delivery quantity Q is shown by the various curves. Curve 1, for example, starts at Q=0 mm³ delivery quantity, with the delivery duration initially held constant at value x° KW. Here, control valve 5 is in ballistic mode, i.e. opening cross-section 8 initially is at its highest value, so that delivery quantity Q=0. With increasing control voltage Ua, opening cross-section 8 becomes smaller, so that delivery quantity Q increases along curve 1 until, at the break point, maximum value Q2 is reached initially. Here, control valve 5 rests on valve seat 7 and has inlet channel ZK closed. A further increase of fuel quantity Q to be injected is now only possible by increasing delivery duration FD along the linear portion of curve 1. Curve 4 starts with delivery quantity Q1 and enters the right branch of curve 1 or 2 with increasing delivery duration FD. Q1 is the delivery quantity at $U_{max}$, i.e. when control valve 5 rests on valve seat 7 and opening cross-section 8 is closed (=0). Q1 here is significantly higher than the smallest required quantity. The same applies to Q1 in FIG. 5 as well.

In ballistic mode, for example, control valve 5 is held at an intermediate position, according to straight lines 2 and 3, by voltage U1 or U2, so that more or less fuel is able to flow from the high-pressure channel to inlet channel ZK. Delivery quantities Q are given accordingly. For example, straight line 2 shows, in the case of trigger voltage U1, that the delivery quantity increases linearly with delivery duration FD. Straight line 3 shows that, at higher trigger voltage U2, delivery quantity Q also increases, since a higher voltage causes opening cross-section 8 to become smaller. If, for example, during ballistic mode, voltage Q1 is selected for the left branch of curve 2, the delivery quantity increases up to value Q3 for delivery duration x° KW. With increasing trigger voltage Ua and constant delivery duration FD, delivery quantity Q now increases, as shown by the vertical partial curve, until value Q2 is reached. Afterwards, delivery duration FD is again increased, so that curve 2 runs the same way as curve 1. In this branch, nonballistic mode is again in effect. Transition to nonballistic mode takes place at delivery quantity Q2 whose value depends on the actuator type, among other things.

Figure 3A:
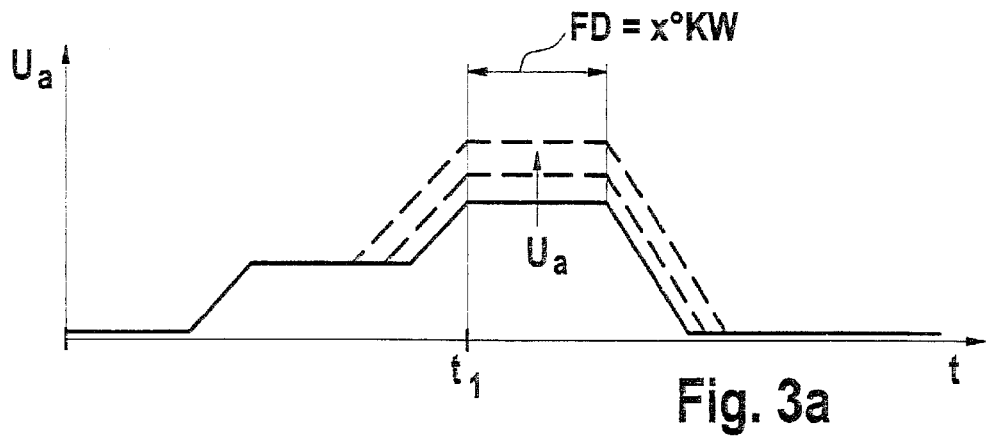
FIG. 3a shows a first characteristic curves for the trigger signal.
Figure 3B:
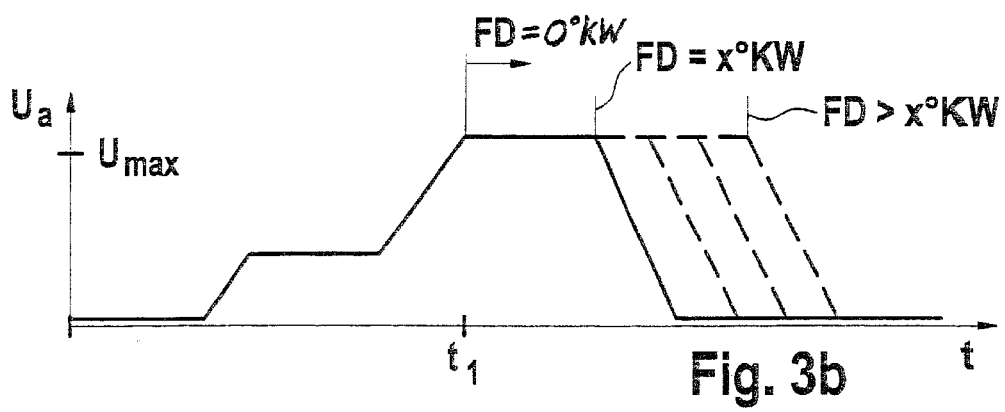
FIG. 3b shows a second characteristic curves for the trigger signal.

The characteristic curves for trigger signal Ua according to FIGS. 3a and 3b show trigger cycles for the transition from ballistic to nonballistic mode via an increase in voltage. Here, FIG. 3a shows the trigger sequence for curve 1 of FIG. 2 along with the ballistic area. As FIG. 3a further shows, trigger voltage Ua is increased stepwise until, at instant t1, fuel delivery begins for injection. It is possible to vary voltage Ua according to the broken-line curves in FIG. 3a, with delivery duration FD remaining constant. After disconnection, control voltage Ua drops to the value of 0 according to the slope shown.

In FIG. 3b, on the other hand, delivery duration FD is selectively increased when reaching maximum voltage $U_{max}$, resulting in the broken-line characteristics in this case. This applies to the nonballistic mode of curve 4 in FIG. 2.

Figure 4A:
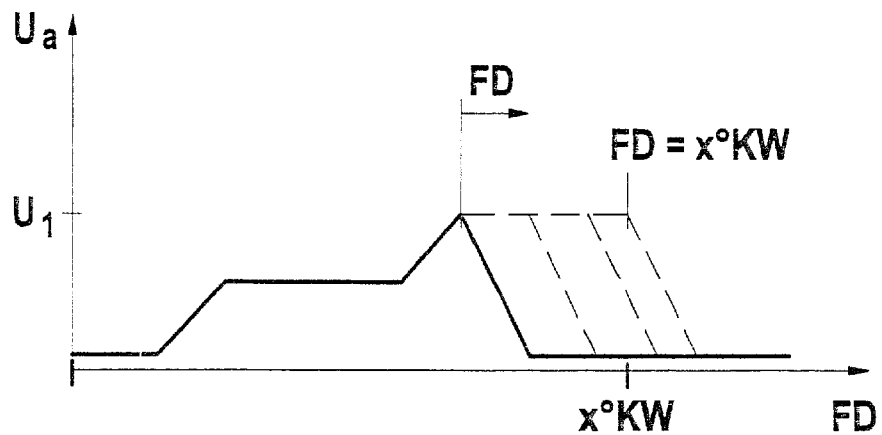
FIG. 4a shows a first additional characteristic curve for the trigger signal.
Figure 4B:
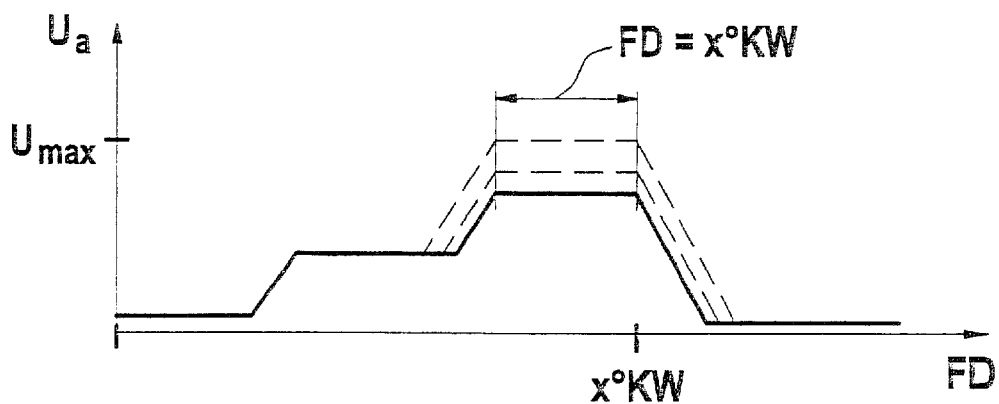
FIG. 4b shows a second additional characteristic curve for the trigger signal.
Figure 4C:
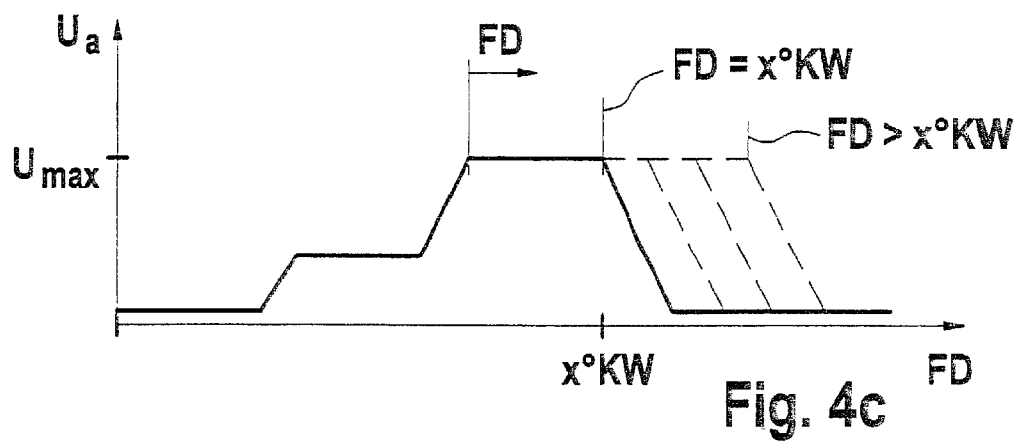
FIG. 4c shows a third additional characteristic curve for the trigger signal.

FIGS. 4a through 4c show additional characteristics for the trigger signal. For example, according to FIG. 4a, control valve 5 remains in ballistic mode when trigger voltage Ua=U1. Delivery duration is now extended from 0° to x° KW according to the broken-line characteristics or a corresponding period of time (left branch of curve 2 in FIG. 2). Now, if delivery duration FD reaches value x° KW, for example, delivery quantity Q increases as shown by the vertical branch of curve 2 in FIG. 2, because control signal Ua was increased as shown in FIG. 4b. Control valve 5 now firmly rests on valve seat 7 at $U_{max}$. According to FIG. 4c, delivery duration FD is now extended as shown by the broken-line characteristics. Delivery quantity Q changes correspondingly along the right partial curve 2 in FIG. 2.

Similar behavior applies to control voltage Ua=U2.

Figure 5:
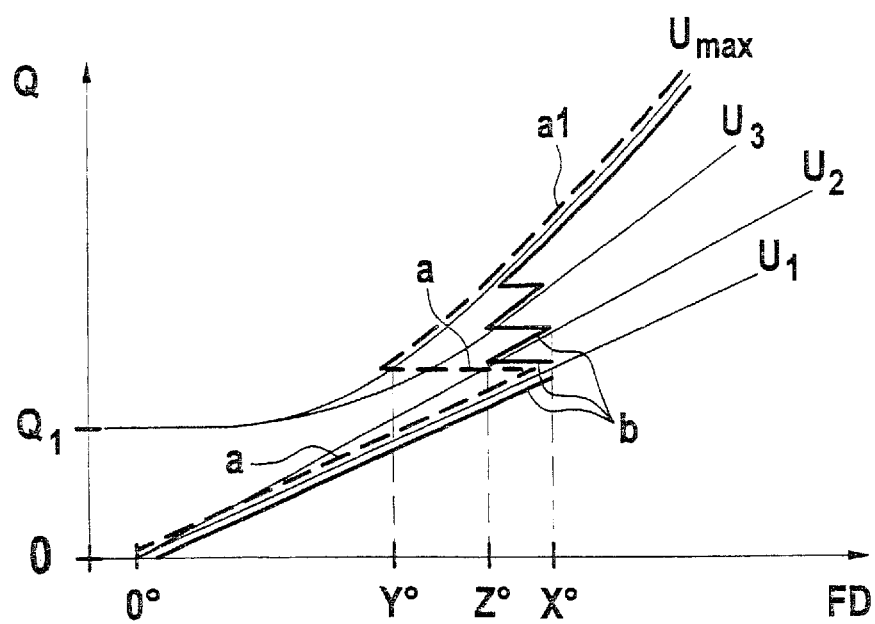
FIG. 5 is a second diagram having discontinuous characteristic curves for the triggering signals in the injection quantity characteristics map.
Figure 6:
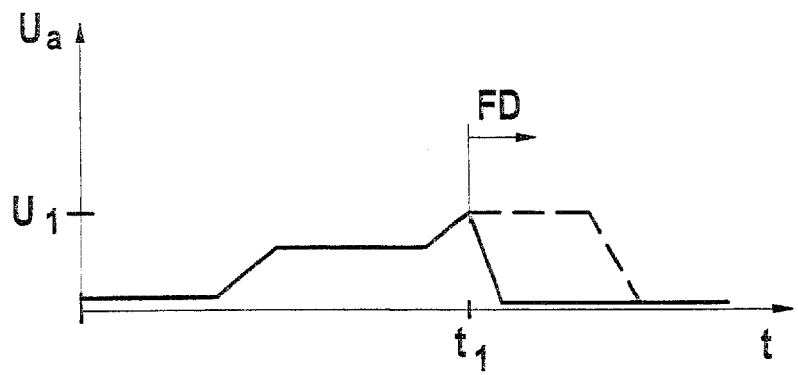
FIG. 6 shows a first alternative characteristic curve for the trigger signal.
Figure 7:
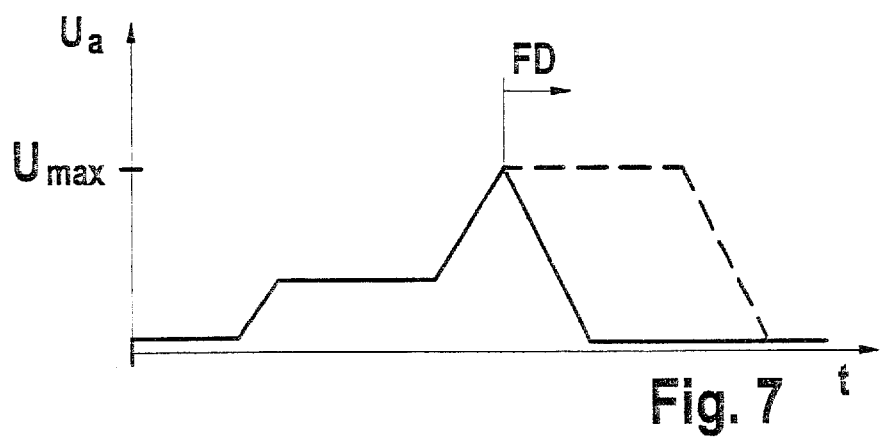
FIG. 7 shows a second alternative characteristic curve for the trigger signal.

FIGS. 5 through 7 show, in another embodiment, how coordinating delivery duration FD and increase in voltage make it possible to prevent intersections by inserting one or several jumps. FIG. 5 shows a second delivery-quantity diagram having several jumps in the trigger signals, where delivery quantity Q is plotted on the y axis against delivery duration FD on the x axis. Curve a is a nonlinear curve having a jump. For example, assuming delivery duration FD=0°, delivery duration FD increases along curve a (with trigger voltage $U_1$) until duration FD=value x°. In this position, the amplitude of trigger voltage Ua as well as delivery duration FD are changed, while the delivered fuel quantity remains the same. For example, the voltage is set to the maximum, and the delivery duration is limited to value y°. An increase in delivery quantity Q is now possible only along additional curve a1 if, in turn, delivery duration FD is increased.

In an alternative embodiment of the present invention, several jumps are possible instead of just one jump. This is represented by characteristics b. Delivery duration FD is switched between values x° and z°. If, for example, the delivery duration reaches value x°, corresponding to voltage U1, an upward switch is made to control voltage U2 and, at the same time, the delivery duration is reduced to value z°. Now, delivery duration FD is again increased until value x° is reached again. At this point, another switch is made—as shown in characteristic curve b—to the next higher voltage U3 having delivery duration z°. Now, delivery duration FD is again increased until value x° is reached. Now, a jump back is made to characteristic curve a1, as was shown in the previous example. This characteristic curve a1 corresponds to the maximum trigger voltage $U_{max}$ which is permissible for the selected actuator type. It must be noted, however, that the switch, or jump, from FD and Ua always takes place at points of the same delivery quantity Q. The number of jumps is freely selectable. Many small jumps result in a better tolerance and engine behavior than few large jumps.

FIGS. 6 and 7 show corresponding voltage curves for trigger voltage U1 for ballistic mode. According to FIG. 6, control voltage Ua is increased until delivery starts at instant t1. Now, delivery duration FD is extended as shown by the broken-line curve. If—as in FIG. 7—trigger voltage Ua reaches maximum value $U_{max}$, nonballistic mode is in effect, during which the delivery duration is extended according to the broken line.

What is claimed is:

1. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity; and an amount of fuel injected is decreased when the inlet channel for excess fuel is opened;

wherein the trigger signal for an injection quantity that is so low that the control valve is maintained in a ballistic mode having an opening cross-section for the inlet channel, and for increasing the injection quantity, the trigger signal is increased in order to narrow the opening cross-section for the inlet channel.

2. The method according to claim 1, wherein:
the actuator includes a piezoelectric element.

3. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity;

an amount of fuel injected is decreased when the inlet channel for excess fuel is opened; and increasing the trigger signal until the control valve goes into a nonballistic mode and closes the inlet channel.

4. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity;

an amount of fuel injected is decreased when the inlet channel for excess fuel is opened; and extending the duration of the trigger signal in order to increase the fuel quantity to be injected, the duration of the trigger signal corresponding to a duration of a delivery.

5. The method according to claim 4, further comprising:
extending the duration of the delivery until the fuel quantity that is injected is larger than a quantity attainable with the control valve when closed and a short trigger signal having a high amplitude.

6. The method according to claim 5, wherein:
at least one jump is made, during which the duration of the delivery and the amplitude of the trigger signal are changed simultaneously.

7. The method according to claim 6, wherein:
a maximum value of the amplitude of the trigger signal is selected with only one jump, and the duration of the delivery is changed in order to determine the fuel quantity to be injected.

8. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity; and an amount of fuel injected is decreased when the inlet channel for excess fuel is opened;

wherein the trigger signal for the fuel quantity to be injected occurs in several jumps, and a duration of a delivery and the amplitude of the trigger signal are changed with each jump.

9. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity;

an amount of fuel injected is decreased when the inlet channel for excess fuel is opened; and changing the amplitude of the trigger signal and a duration of a delivery until the trigger signal reaches a maximum value.

10. The method according to claim 9, wherein:
a further increase in quantity is achieved by extending the duration of the delivery.

11. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity; and an amount of fuel injected is decreased when the inlet channel for excess fuel is opened;

wherein the trigger signal for an injection quantity that is so low that the control valve is maintained in a ballistic mode having an opening cross-section for the inlet channel, and for increasing the injection quantity, the trigger signal is increased in order to narrow the opening cross-section for the inlet channel.

12. A method of controlling an injector to inject a specified fuel quantity into a cylinder of an internal combustion engine, comprising:

triggering a control valve of the injector by an actuator to one of open and close an inlet channel for an excess fuel, wherein:

a trigger signal for the actuator is variable in at least one of an amplitude and a duration for controlling a fuel quantity;

an amount of fuel injected is decreased when the inlet channel for excess fuel is opened; and increasing the trigger signal until the control valve goes into a nonballistic mode and closes the inlet channel.

* * * * *